United States Patent [19]

Shimizu et al.

[11] Patent Number: 4,850,019
[45] Date of Patent: Jul. 18, 1989

[54] DATA RANDOMIZATION EQUIPMENT

[75] Inventors: Akihiro Shimizu, Yokosuka; Shoji Miyaguchi, Yokohama, both of Japan

[73] Assignee: Nippon Telegraph and Telephone Corporation, Tokyo, Japan

[21] Appl. No.: 926,043

[22] Filed: Nov. 3, 1986

[30] Foreign Application Priority Data

Nov. 8, 1985 [JP] Japan ................................. 60-250398
Nov. 13, 1985 [JP] Japan ................................. 60-252650

[51] Int. Cl.$^4$ .............................................. H04K 1/00
[52] U.S. Cl. ......................................... 380/29; 380/33; 380/37; 380/46; 380/50
[58] Field of Search ........................ 380/29, 33, 37, 46, 380/50; 375/1

[56] References Cited

U.S. PATENT DOCUMENTS

| | | | |
|---|---|---|---|
| 3,370,126 | 2/1968 | Scidmore | 380/33 |
| 3,798,360 | 3/1974 | Feistel | 380/37 |
| 4,217,586 | 8/1980 | McGuffin | 375/1 X |
| 4,409,434 | 10/1983 | Basset et al. | 380/50 |
| 4,707,839 | 11/1987 | Andren et al. | 375/1 |
| 4,731,843 | 3/1988 | Holmquist | 380/29 |

FOREIGN PATENT DOCUMENTS 0105553  4/1984  European Pat. Off. .

OTHER PUBLICATIONS

"Exhaustive Cryptanalysis of the NBS Data Encryption Standard", by W. Diffie et al., Computer, vol. 10, No. 6, Jun. 1977, pp. 74-84.
"Modular Design of Information Encipherment for Computer Systems", by J. P. Pieprzyk, Computers & Security, vol. 4, No. 3, Sep. 1985, pp. 211-218.
"Structured Design of Substitution-Permutation Encryption Networks", by J. B. Kam et al., IEEE Trans. on Computers, vol. C-28, No. 10, Oct. 1979, pp. 747-753.
"Data Security Device" by P. N. Prentice, IBM Technical Disclosure Bulletin, vol. 19, No. 7, Dec. 1976, pp. 2607-2609.

Primary Examiner—Stephen C. Buczinski
Assistant Examiner—Bernarr Earl Gregory
Attorney, Agent, or Firm—Pollock, Vande Sande and Priddy

[57] ABSTRACT

Input data is split by a splitting part into a plurality of block data having an equal data length to be processed through respective channels. Each channel data is subjected in a function operation part to a function operation in direct or indirect relation to all the other channel data to produce new channel data. Each channel data is subjected in a transform operation part to a transform operation to produce new channel data. All final channel data obtained after function and transform operations are combined by a combining part to obtain randomized data.

26 Claims, 10 Drawing Sheets

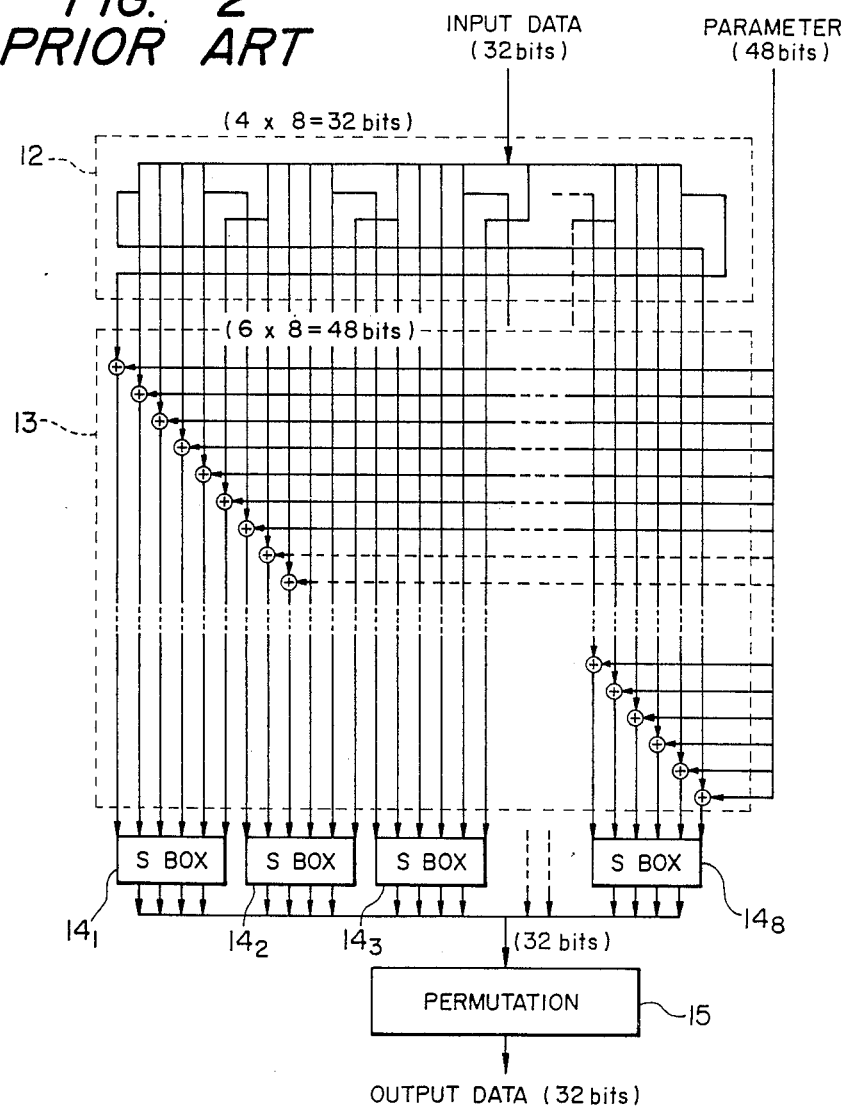

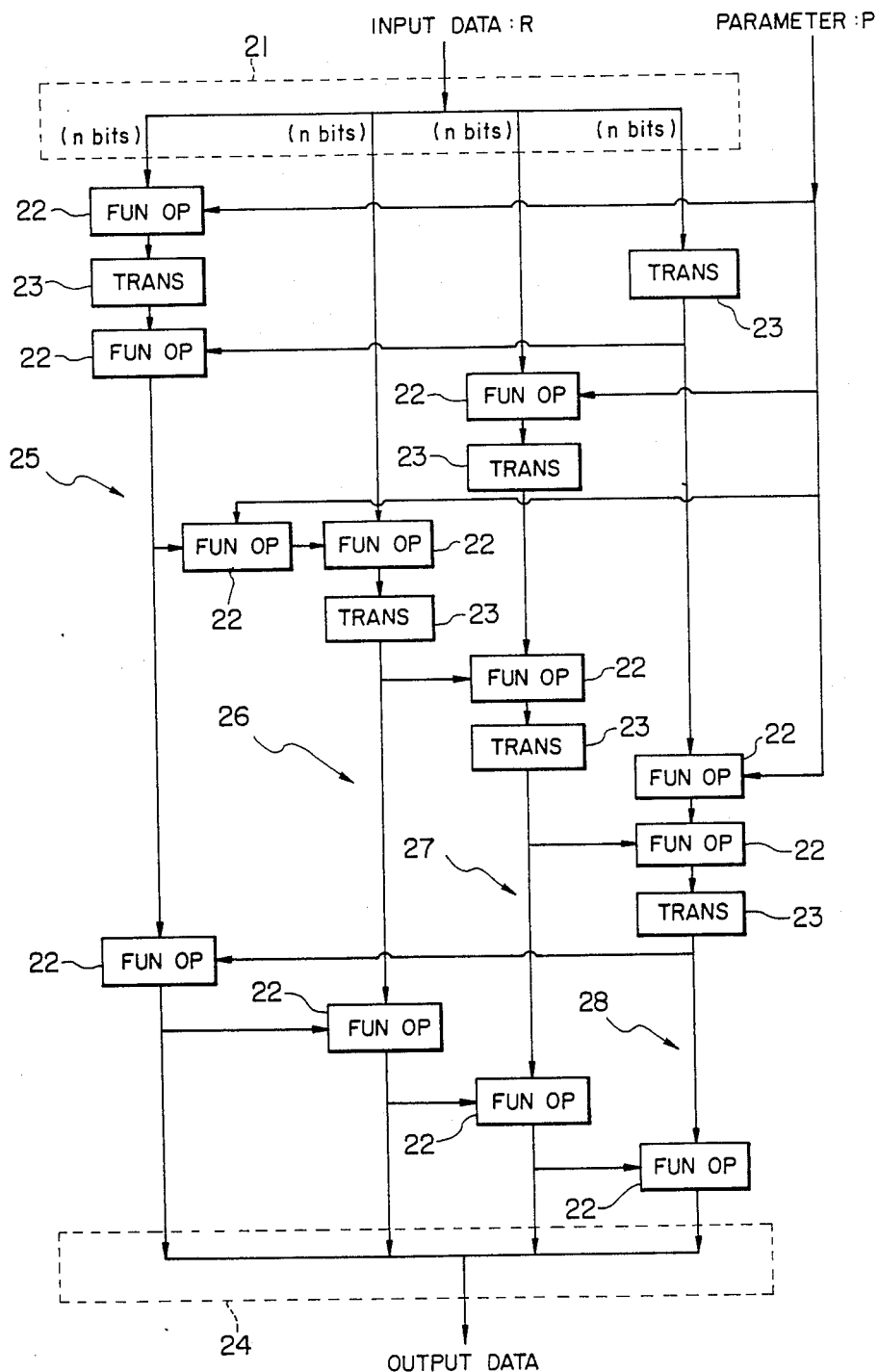

DATA RANDOMIZATION EQUIPMENT

BACKGROUND OF THE INVENTION

This invention relates to a data randomization equipment for randomizing digital data and to be used for random number generators for generating random numbers of digital data and for encrypting and decrypting processes of cryptographic equipment.

The data randomization equipment will first be briefly described. As shown in FIG. 1, data randomization equipment receives digital input data and digital parameter data and provides randomized data as output data.

High class data randomization equipment requires that nearly one half of the output data bits be changed with a slight change in the input data or parameter data.

The prior art will be described as an example of data randomization equipment which is employed in the DES encrypter as a typical cryptographic equipment. FIG. 2 shows this data randomization equipment. The size of 32-bit input data is expanded by data expanding means 12 into 48-bit data. In this data expansion, the 32-bit input data is split into eight blocks each of 4 bits, and the bits on both sides of each 4-bit block are each branched into two bits.

Exclusive OR part 13 takes exclusive OR between each bit of the expanded 48-bit data and a corresponding bit of 48-bit parameter data. The resultant 48-bit data is split into 8 blocks each of 6 bits, and these data blocks are fed to respective ROMs $14_1$ to $14_8$ which are commonly termed S boxes. The S boxes $14_1$ to $14_8$ each provide 4-bit data using the 6-bit input data as an address. The 32-bit data constituting the outputs of all the S boxes $14_1$ to $14_8$ is fed to a permutation part 15 constituted by a wired circuit. The permutation part 15 effects bit position re-arrangement of the 32-bit input data and yields the resultant output as a randomized output.

In this prior art equipment, with a change in the input to each of the S boxes $14_1$ to $14_8$, only one bit at the least to 4 bits at the most of the output undergo a change from "0" to "1" or from "1" to "0", that is, 2.5 bits, in average, of the output are changed. This means that with the occurrence of the change of one bit in the input data to the prior art data randomization equipment, only one bit in the least to 8 bits at the most, i.e., only 4 bits in average, of the 32-bit output data are changed. Further, with a change of one bit of the parameter data to this equipment only 2.5 bits of the output data are changed.

SUMMARY OF THE INVENTION

An object of the invention is to provide a data randomization equipment, in which nearly one half of the output data bits are changed with a change of one bit or a very small number of bits of the input data.

According to the invention, input data is split by splitting means into a plurality of blocks each of an equal data length to be processed as channel data in respective processing channels. Each channel data is subjected at least once to function operation in direct or indirect relation to all the other channel data in function operation means, whereby the channel data is renewed. Each channel data is also subjected to a transform operation in transform operation means, whereby the new channel data is further modified into further new channel data. Final channel data obtained after function and transform operations are combined in combining means to produce randomized data corresponding to the input data. Where parameter data is used, at least one channel data is subjected in function operation means to a function operation in relation to the parameter data to obtain new channel data or new parameter data.

The function operation means performs an exclusive OR operation on two data, or it performs an addition operation on two data and then a modulo operation on the resultant sum data. The transform operation means performs a bit circulation operation on channel data, or it performs a bit position permutation operation on channel data through a wired circuit, or it performs a transform operation on channel data inclusive of data alteration using a ROM or like memory. In some cases, changeover means is provided to selectively use transform operation means and function operation means according to channel data or parameter data or selectively use transform or function operation means and bypass means.

According to another aspect of the invention, a plurality of randomization stages are provided in cascade connection, each stage including randomizing means. Input data is fed to the first one of the cascade connected randomization stages for randomization through the consecutive randomization stages. In all or some of the randomization stages subsequent to an N-th (N being 2 or a greater integer) stage, the input data to the randomizing means in the preceding randomization stage is fed as parameter data to the randomizing means of the pertinent stage. As the randomizing means, use can be made of the aforementioned randomization equipment.

According to the invention, each of a plurality of channel data is subjected to function operation in direct or indirect relation to all the other channel data, so that each final channel data is influenced by all the channel data. Therefore, a one-bit change in the input data leads to a change in a large number of bits of the output data.

BRIEF DESCRIPTION OF THE DRAWINGS

FIG. 1 is a view showing a concept of data randomization equipment;

FIG. 2 is a view showing data randomization equipment used for a prior art DES encryption equipment;

FIG. 3 is a block diagram showing an example of the arrangement of data randomization equipment according to the invention;

DETAILED DESCRIPTION OF THE PREFERRED EMBODIMENT

Figure 4:
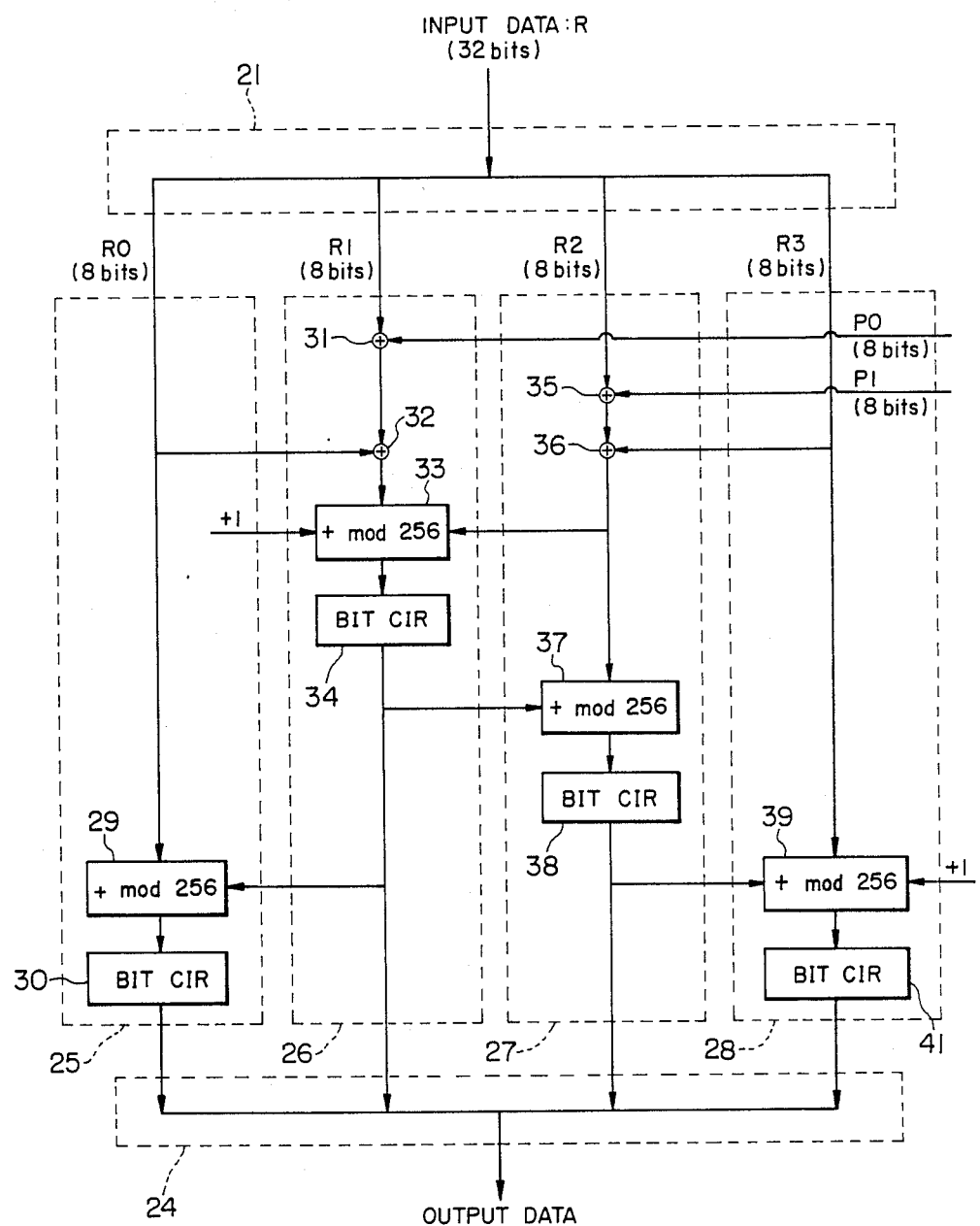
FIG. 4 is a block diagram showing one embodiment of the data randomization equipment according to the invention.

FIG. 3 shows an example of the arrangement of the equipment according to the invention. Input data R is split by a splitting part 21 into a plurality of blocks each with a data length of n bits. The individual block data obtained from the splitting part 21 are processed as channel data through respective processing channels 25 to 28. In each of the processing channels, the channel data is processed through at least one function operation part 22 and, upon request, a transform part 23. The outputs of the individual channels 25 to 28 are combined by combining part 24 to be yielded as output data.

Each function operation part 22 performs a function operation on the input channel data of the pertinent channel with a channel data of a different channel or with parameter data to produce a renewed channel data. Alternatively, it performs a function operation on the channel data and parameter data to produce a new parameter data. Each transform part 23 performs bit circulation or bit permutation operation on the input channel data of the pertinent channel to produce a new channel data.

FIG. 4 shows an embodiment of the invention. In this embodiment, 32-bit input data is processed to obtain 32-bit randomized output data using 16 bits of parameter data. The 32-bit input data R is split by splitting part 21 into 8-bit blocks R0 to R3.

The block data R0 to R3 are input as channel data to, and processed through, respective processing channels 25 to 28 provided between the splitting part 21 and the combining part 24. In channel 25, addition/modulo operation circuit 29 and bit circulation circuit 30 are provided in the mentioned order. In channel 26, exclusive OR circuits (hereinafter referred to as EOR circuits) 31 and 32, addition/modulo operation circuit 33 and bit circulation circuit 34 are provided in the mentioned order. In channel 27, EOR circuits 35 and 36, addition/modulo operation circuit 37 and bit circulation circuit 38 are provided. In channel 28, addition/modulo operation circuit 39 and bit circulation circuit 41 are provided. Parameter data P0 and P1 are fed to the respective EOR circuits 31 and 35, and the block data R0 and R3 are fed to the respective EOR circuits 32 and 36. A constant +1 and outputs of the EOR circuits 32 and 36 are fed to the addition/modulo operation circuit 33. The output of the addition/modulo operation circuit 33 is supplied to the bit circulation circuit 34. The output of the bit circulation circuit 34 is fed to the addition/modulo operation circuit 29. The outputs of the bit circulation circuit 34 and the EOR circuit 36 are fed to the addition/modulo operation circuit 37. A constant +1, block data R3 and output of the bit circulation circuit 38 are fed to the addition/modulo operation circuit 39.

The EOR circuits 31, 32, 35 and 36 each perform a bit-by-bit exclusive OR operation on the two input data. The addition/modulo operation circuits 29, 33, 37 and 39 each perform addition of the input data and then perform modulo 256 operation on the resultant sum data. Modulo operation x mod y means an operation of obtaining the remainder of division of x by y. The bit circulation circuits 30, 34, 38 and 41 each perform a 2-bit leftward circular shift of their input data. The EOR circuits 31, 32, 35 and 36 and addition/modulo operation circuits 29, 33, 37 and 39 each constitute the function operation part 22, while the bit circulation circuits 30, 34, 38 and 41 each constitute the transform part 23 in FIG. 3.

With this equipment, the input data is subjected to the following randomization process, where variables R0, R1, R2 and R3 represent the channel data of the respective channels 25, 26, 27 and 28, P0 and P1 represent the parameter data, notation "cir" represents a 2-bit leftward circular shift of data, and a leftward arrow symbol "←" signifies the substitution of the result of the operation on the right side for the variable on the left side.

| 1st step: | $R1 \leftarrow R1 \oplus P0 \oplus R0$ in circuits 31 and 32 |
|---|---|
| | $R2 \leftarrow R2 \oplus P1 \oplus R3$ in circuits 35 and 36 |
| 2nd step: | $R1 \leftarrow (R1 + 1 + R2) \mod 256$ in circuit 33 |
| 3rd step: | $R1 \leftarrow \text{cir } R1$ in circuit 34 |
| 4th step: | $R2 \leftarrow (R1 + R2) \mod 256$ in circuit 37 |
| 5th step: | $R2 \leftarrow \text{cir } R2$ in circuit 38 |
| 6th step: | $R0 \leftarrow (R0 + R1) \mod 256$ in circuit 29 |
| | $R3 \leftarrow (R3 + R2 + 1) \mod 256$ in circuit 39 |
| 7th step: | $R0 \leftarrow \text{cir } R0$ in circuit 30 |
| | $R3 \leftarrow \text{cir } R3$ in circuit 41 |

The final channel data R0 to R3 of the individual channels 25 to 28, which have been obtained through the above randomization process, are combined in the combining part 24 to obtain output data.

The final data of each channel has been influenced either directly or indirectly by the block data inputs to all the channels 25 to 28. For example, with respect to the channel data R0 it will be seen that the channel data R2 and R3 are influenced by each other in the EOR circuit 36, the output of which in turn influences channel data R1 in the addition/modulo operation circuit 33, which is coupled through the bit circulation circuit 34 to the addition/modulo operation circuit 29. That is, the channel data R0 is influenced by all the other channel data R1 to R3. In this manner, all the channel data are each influenced by the other. Consequently, when a change occurs in one bit of the input data, the channel data other than the one having the changed bit are also influenced by this one-bit change. In each of the EOR circuits 32 and 36, a change of one bit of the channel data input thereto leads to a change in one bit of the output data therefrom. In each of the addition/modulo operation circuits 29, 33, 37 and 39, a change of one bit of the channel data input thereto leads to a change of at least one bit and at most all the bits, in this embodiment 8 bits, of the output data therefrom. In each of the bit circulation circuits 30, 34, 38 and 41, a one-bit change in the channel data input thereto leads to a 2-bit change in the output data therefrom. Thus, a one-bit change in the input data R leads to a change of 11 bits in average of the output data. This effect is a pronounced improvement over the prior art technique shown in FIG. 2, in which one-bit change in the input leads to a change of only about 4 bits of the output.

In the embodiment shown in FIG. 4, the parameter data P0 and P1 are operated directly on the channel data immediately from the splitting part 21. Thus, a one-bit change in the parameter data influences all the channel data, so that a great randomization effect can be achieved. In the above embodiment, the bit circulation circuits 30, 34, 38 and 41 have been explained as performing bit circulation by 2 bits, but they may perform other extents of bit circulation.

Figure 5:
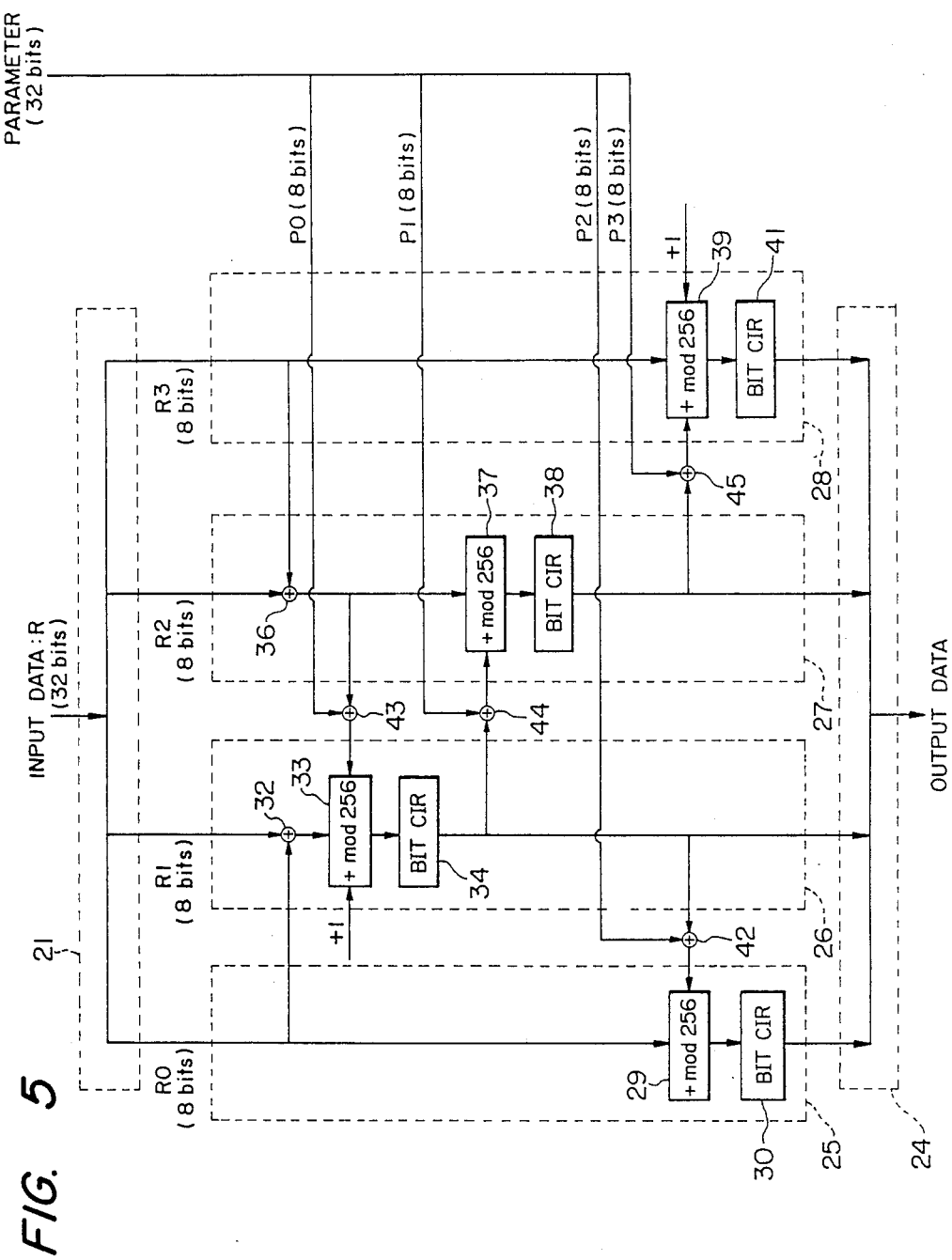
FIG. 5 is a block diagram showing a different embodiment of the data randomization equipment according to the invention.

In the above embodiment of FIG. 4, the parameter data are operated on the channel data to produce renewed channel data. However, it is also possible to use the operation result as new parameter data in the equipment. FIG. 5 shows a different embodiment, in which new parameter data is produced from the aforesaid operation. In FIG. 5, parts corresponding to those in FIG. 4 are designated by like reference numerals. In this example, those corresponding to the EOR circuits 31 and 35 in the processing channels 26 and 27 of FIG. 4, to which the parameter data are fed, have been omitted. Instead, EOR circuits 42, 43, 44 and 45 are connected to foreign channel data input sides of the addition/modulo operation circuits 29, 33, 37 and 39 in channels 25, 26, 27 and 28. Parameter data P2, P0, P1 and P3 are fed to the respective EOR circuits 42 43, 44 and 45 and operated on the channel data inputs thereto, whereby new parameter data are produced to be fed to the corresponding addition/modulo operation circuits 29, 33, 37 and 39. Again in this case, a one-bit change in the input data R leads to a 11-bit change in average in the output data.

Figure 6:
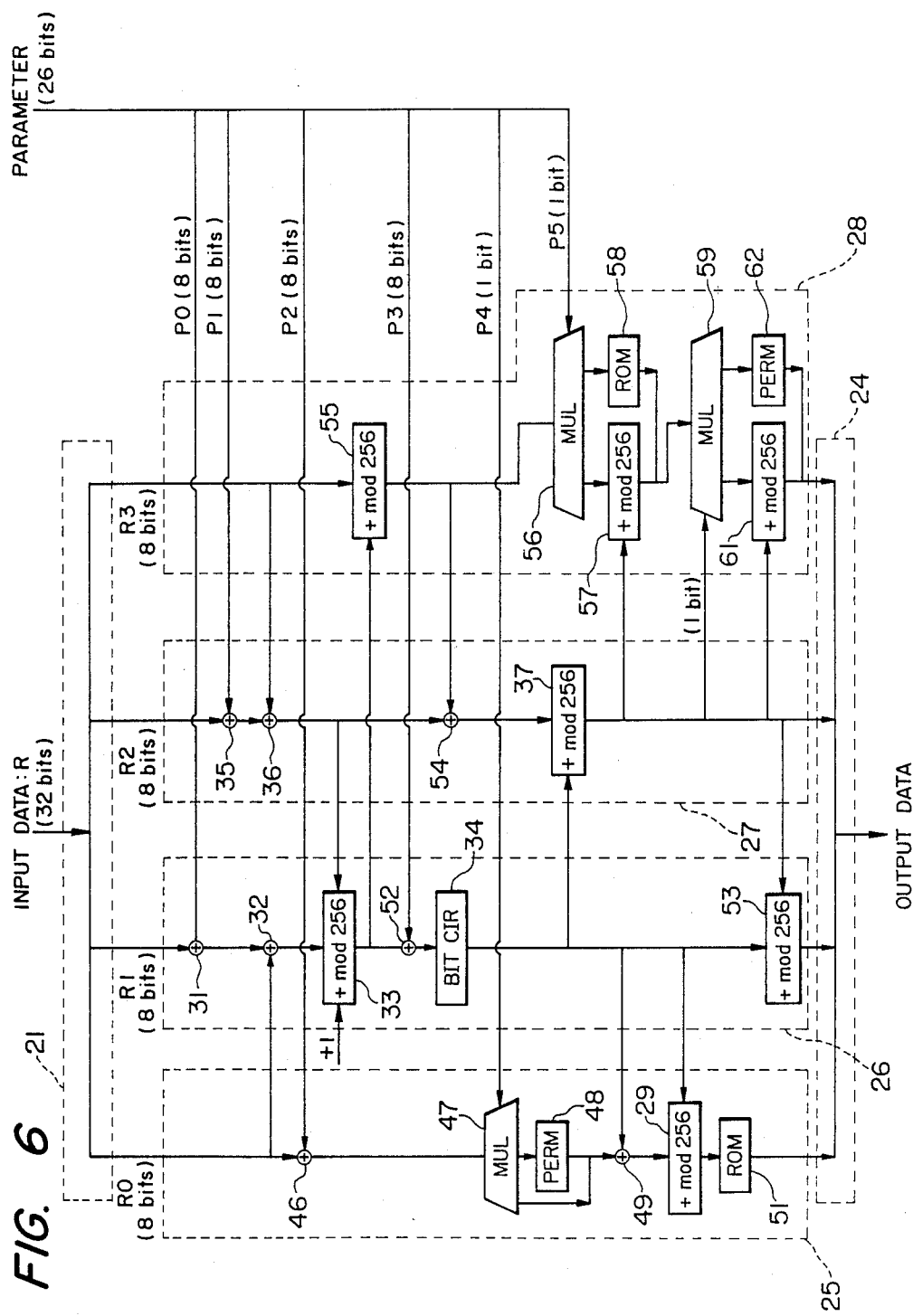
FIG. 6 is a block diagram showing a further embodiment of the invention, in which transform and function operations are changed over dynamically.

It is possible to cause dynamic changeover of the types of processings according to the values of channel data and/or parameter data. FIG. 6 shows a further embodiment which permits such changeover. In the Figure, parts corresponding to those in FIG. 4 are designated by like reference numerals. In this embodiment, processing channel 25 includes cascade connection of EOR circuit 46, multiplexer 47, permutation circuit 48, EOR circuit 49, addition/modulo operation circuit 29 and transform memory 51 in the mentioned order. One output of the multiplexer 47 is connected to the output of the permutation circuit 48 to form a bypass. In channel 26, EOR circuits 31 and 32, addition/modulo operation circuit 33, EOR circuit 52, bit circulation circuit 34 and addition/modulo operation circuit 53 are provided in cascade in the mentioned order. In channel 27, EOR circuits 35, 36 and 54 and addition/modulo operation circuit 37 are provided in cascade in the mentioned order. In channel 28, addition/modulo operation circuit 55, multiplexer 56, a parallel combination of addition/modulo operation circuit 57 and transform memory 58, multiplexer 59 and a parallel combination of addition/modulo operation circuit 61 and permutation circuit 62 are provided in cascade in the mentioned order. Two outputs of the multiplexer 56 are fed to the respective addition/modulo operation circuit 57 and the transform memory 58, the outputs of which are both connected to the same input of the multiplexer 59. Two outputs of the multiplexer 59 are fed to the addition/modulo operation circuit 61 and the permutation circuit 62, the outputs of which are connected to each other. Parameter data P2 and P3 are fed to the respective EOR circuits 46 and 52. The output of the bit circulation circuit 34 is fed to the EOR circuit 49. The output of the addition/modulo operation circuit 37 is fed to the addition/modulo operation circuits 53, 57 and 61. The output of the addition/modulo operation circuit 33 is fed to the addition/modulo operation circuit 55. The multiplexers 47, 56 and 59 each provide its input as either one of its two outputs according to a one-bit control data. The multiplexers 47 and 56 are controlled by respective one-bit parameter data P4 and P5. The multiplexer 59 is controlled by a particular one bit of the output of the addition/modulo operation circuit 37. The permutation circuits 48 and 62 each operate permutation of bit positions on the input data through mere wired circuits. The transform memories 51 and 58 each may consist of a ROM. Their input data are used as addresses to read out transformed data.

In this arrangement, the multiplexer 47 supplies the output of the EOR circuit 46 to the EOR circuit 49 either directly or after transform through the permutation circuit 48 in dependence on the value of parameter data P4. In this way the operation on the channel data is changed over dynamically according to the parameter data. The combination of the states selectable through the multiplexers 56 and 59 allows variety of dynamic change in operation processing on the channel data.

Figure 7:
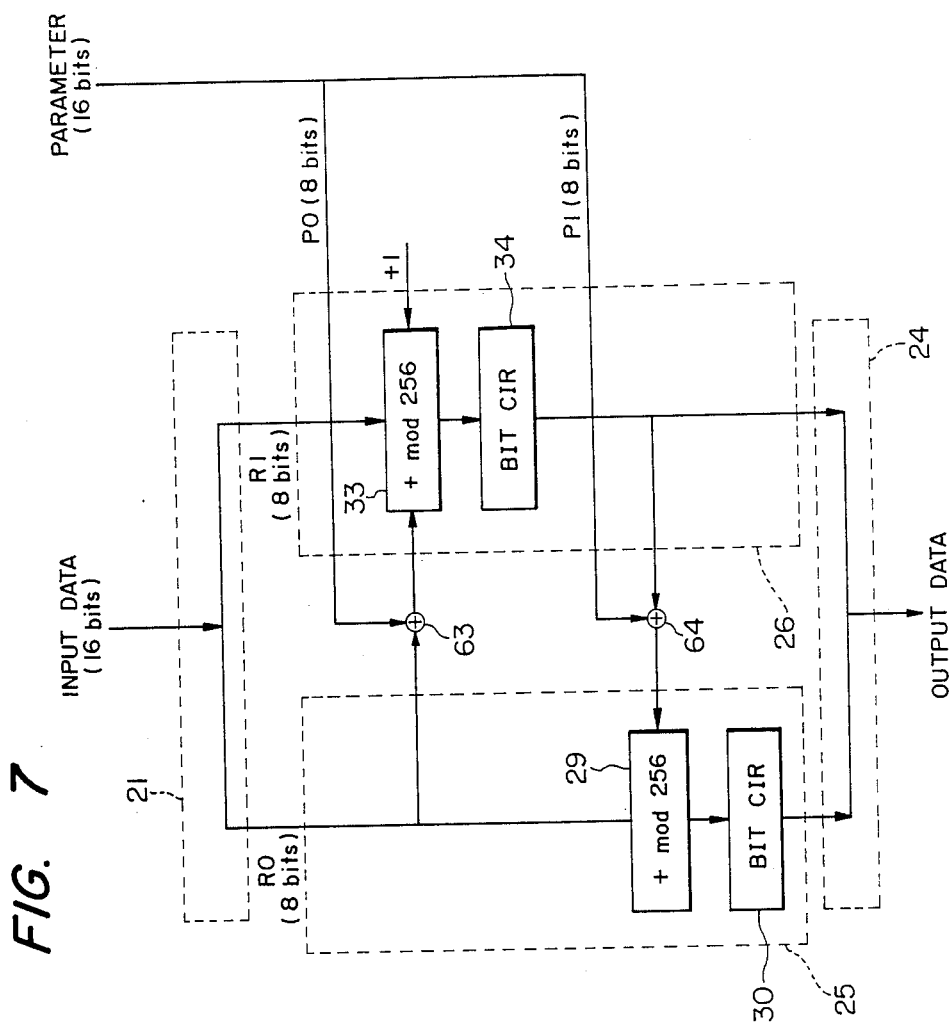
FIG. 7 is a block diagram showing a further embodiment of the invention applied to a data randomization equipment dealing with 16-bit input data.

In the above embodiment, 32-bit input data R was split into 4 one-byte blocks. FIG. 7 shows a further embodiment of the equipment which effects randomization on 16-bit input data. 16-bit input data is split by splitting part 21 into 8-bit block data R0 and R1 for processing through respective channels 25 and 26. The channel 25 includes addition/modulo operation circuit 29 and bit circulation circuit 30, these parts being provided in cascade in the mentioned order. The channel 26 includes addition/modulo operation circuit 33 and bit circulation circuit 34, these parts being provided in cascade in the mentioned order. EOR circuit 63 performs exclusive OR operation on the block data, i.e. channel data R0 and parameter data P0, and its output data is fed to the addition/modulo operation circuit 33. The addition/modulo operation circuit 33 is also supplied with the channel data R1 and a constant +1, and provide its output to the bit circulation circuit 34. EOR circuit 64 performs exclusive OR operation on the output of the bit circulation circuit 34 and parameter data P1, and its output data is fed to the addition/modulo operation circuit 29.

This equipment performs the following randomization process.

| 1st step: | R1 ← ((R0 ⊕ P0) + R1 + 1) mod 256 in circuits 33 and 63 |
|---|---|
| 2nd step: | R1 ← cir R1 in circuit 34 |
| 3rd step: | R0 ← ((R0 + (R1 ⊕ P1)) mod 256 in circuits 29 and 64 |
| 4th step: | R0 ← cir R0 in circuit 30 |

Processed channel data outputs R0 and R1 from the processing channels 25 and 26 are combined in combining means 24 to obtain 16-bit output data.

Data randomization equipment which uses the various arrangements of data randomization equipment described heretofore in each of cascaded plural randomization stages will now be described with reference to FIG. 8. EOR circuit 66 performs exclusive OR operation on 64-bit input data and 64-bit parameter data P4, P5, P6, P7, and its output is split in splitting part 67 into left and right block data each of 32 bits. The left block data is fed as such to first randomization stage 68. EOR circuit 69 performs exclusive OR operation on the left and right block data, and its output data is fed as right block data to the first randomization stage 68.

In each randomization stage 68, the right data input is directly fed as left data input to the subsequent randomization stage 68, while it is also fed to randomizing part 71 for randomization with 16-bit parameter data. The randomized data output of the randomizing part 71 and left data are exclusively ORed in EOR circuit 72, the output of which is fed as right data to the next randomization stage 68. In this instance, four randomization stages 68 are provided in cascade connection, and each randomization stage 68 performs a like process. The left data output of last randomization stage 68 is directly fed to combining part 73. It is also fed to EOR circuit 74 for exclusive ORing with right data. The output of the EOR 74 is fed as right data to the combining part 73. The combining part 73 combines the left and right data to provide 64-bit combined data. EOR circuit 75 performs exclusive OR operation on the 64-bit combined data and 64-bit parameter data to obtain randomized data output. Randomizing part 71 in each randomization stage 68 may be any one of the various arrangements shown in FIGS. 3 to 6.

Figure 9:
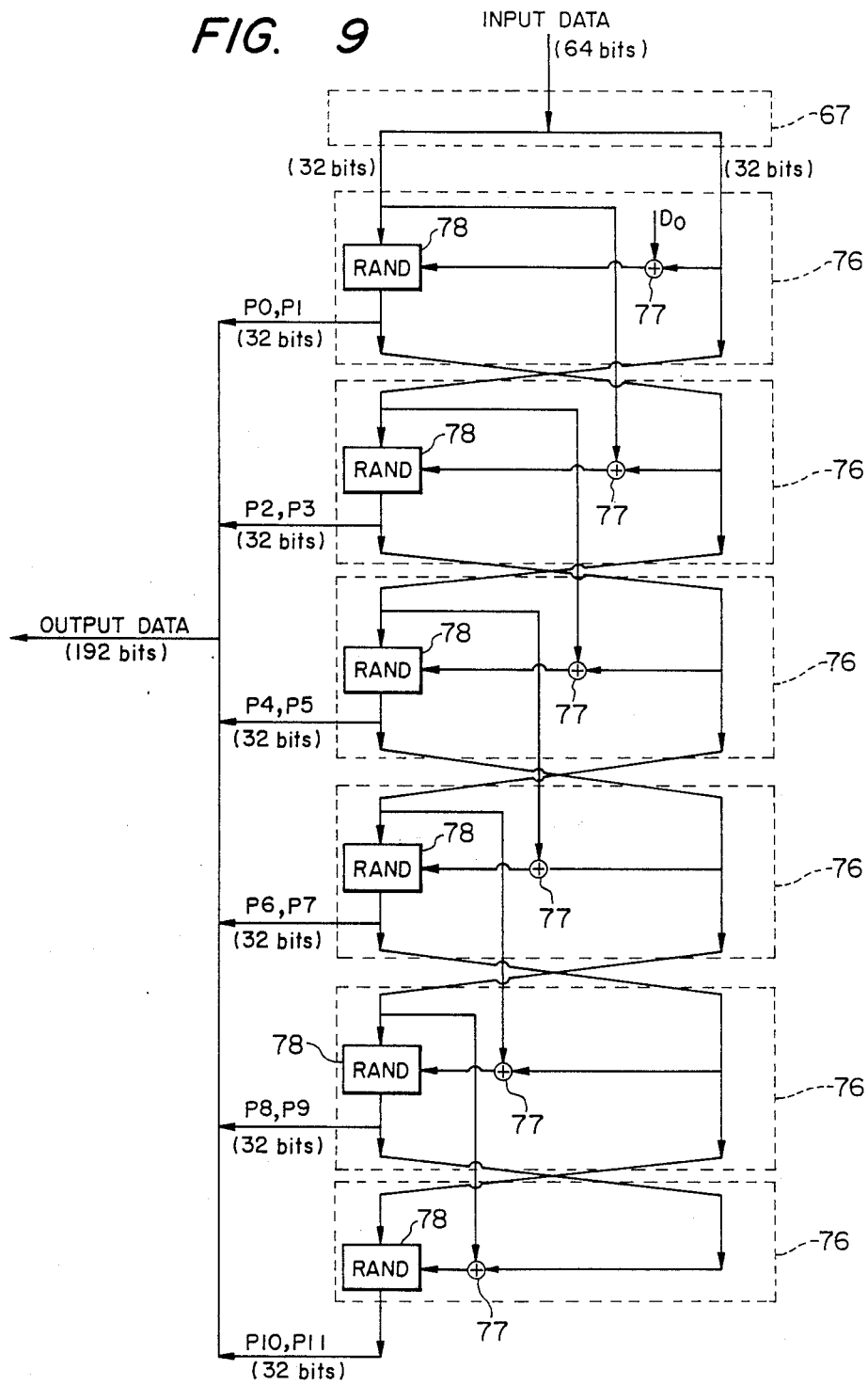
FIG. 9 is a block diagram showing a further embodiment of the data randomization equipment according to the invention, in which similar randomization operation is performed in a plurality of stages without use of any parameter data.

FIG. 9 shows an arrangement for randomizing input data without use of any external parameter data. In this instance, 64-bit input data is split by splitting part 67 into left and right block data each of 32 bits. The block data are fed to a first one of a plurality of cascade-connected randomization stages 76. In each randomization stage, right data is fed as left data input to the next randomization stage 76, and it is also fed to EOR circuit 77. Randomizing part 78 randomizes left data with the output of the EOR circuit 77 used as internal parameter data. The output of the randomizing part 78 is fed as right data to the next randomization stage 76. Suitable constant $D_0$ is fed to the EOR circuit 77 in the first randomization stage 76, while in each of the following randomization stages, left data input to the immediately preceding randomization stage is fed to the EOR 77. The randomizing part 78 of each randomization stage 76 provides 32-bit data as part of 192-bit output data. This means that the 64-bit input data is expanded into 192 bits while it is randomized. The randomizing part 78 may be any one of the arrangements of FIGS. 3 to 6 described above.

Figure 8:
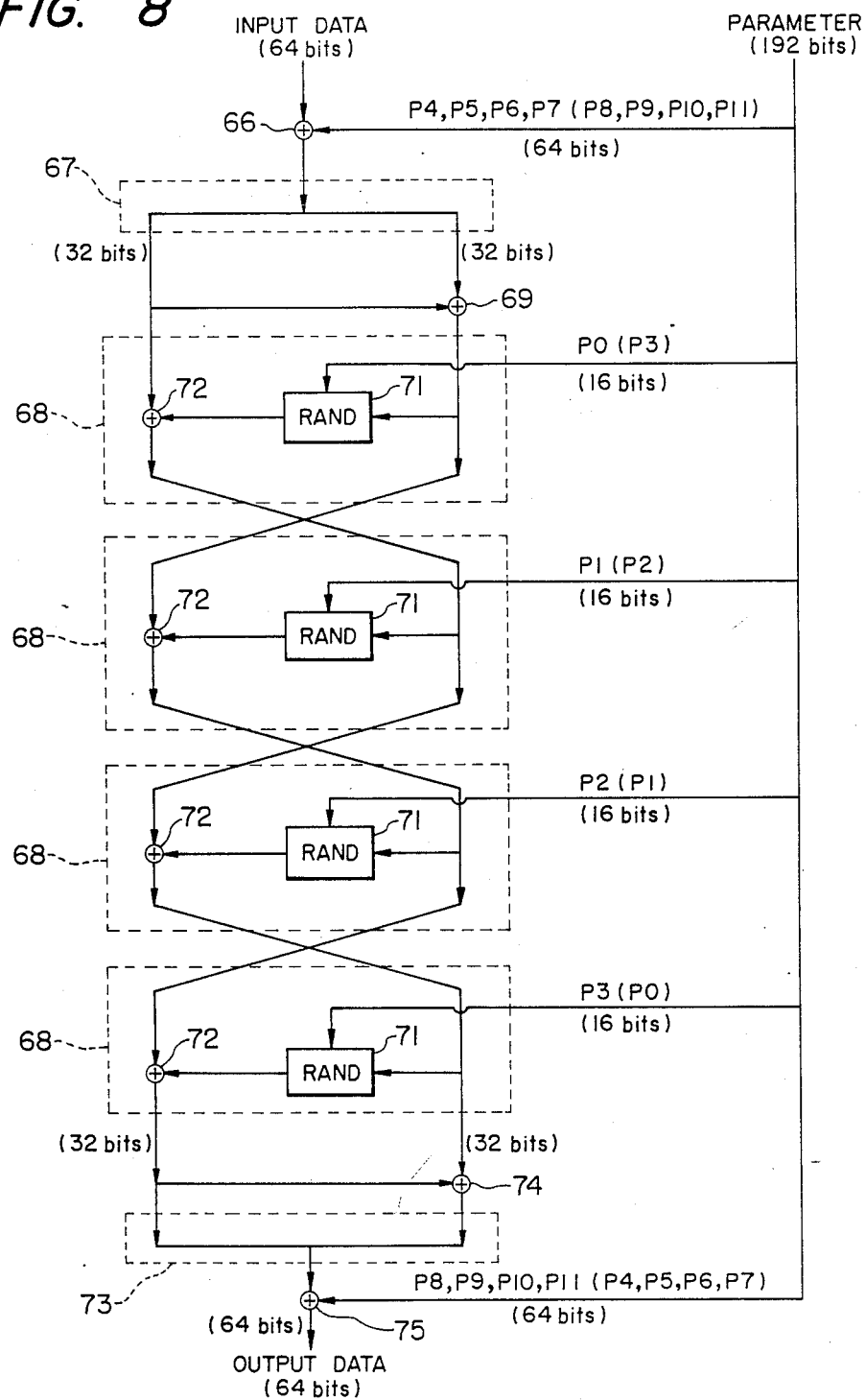
FIG. 8 is a block diagram showing a further embodiment of the data randomization equipment according to the invention, in which similar randomization operation is performed in a plurality of stages.

A combination of arrangements of FIGS. 8 and 9 may be used as cryptographic equipment either for encrypting a plaintext or decrypting a ciphertext. Such equipment has been proposed in the literature entitled "Fast data encipherment algorithm FEAL", IECEJ Technical Report IT 86-33 (1986) by the present inventors. The encription can be implemented as follows: The 64-bit input data shown in FIG. 9 is fed as a secret key. The output data of 32 by 6 bits, i.e. 192 bits, from the six randomization stages 76 is split into twelve intermediate keys P0 to P11 each of 16 bits in the order of the stages. Of these intermediate keys, the intermediate keys P0 to P3 are fed as parameter data to the respective randomization stages 68 in FIG. 8, the intermediate keys P4 to P7 are fed as parameter data to the EOR circuit 66, and the intermediate keys P8 to P11 are fed as parameter data to the EOR circuit 75. By feeding a plaintext as input to the EOR circuit 66, a ciphertext can be obtained from the EOR circuit 75. For decryption, a ciphertext is fed to the EOR circuit 66, intermediate keys P3, P2, P1 and P0 are fed as parameter data to the respective first to last randomization stages 68, while feeding intermediate keys P8 to P11 to the EOR circuit 66 and intermediate keys P4 to P7 to the EOR circuit 75 as shown in parentheses in FIG. 8. By so doing, an original plaintext can be obtained from the EOR circuit 75.

Figure 10:
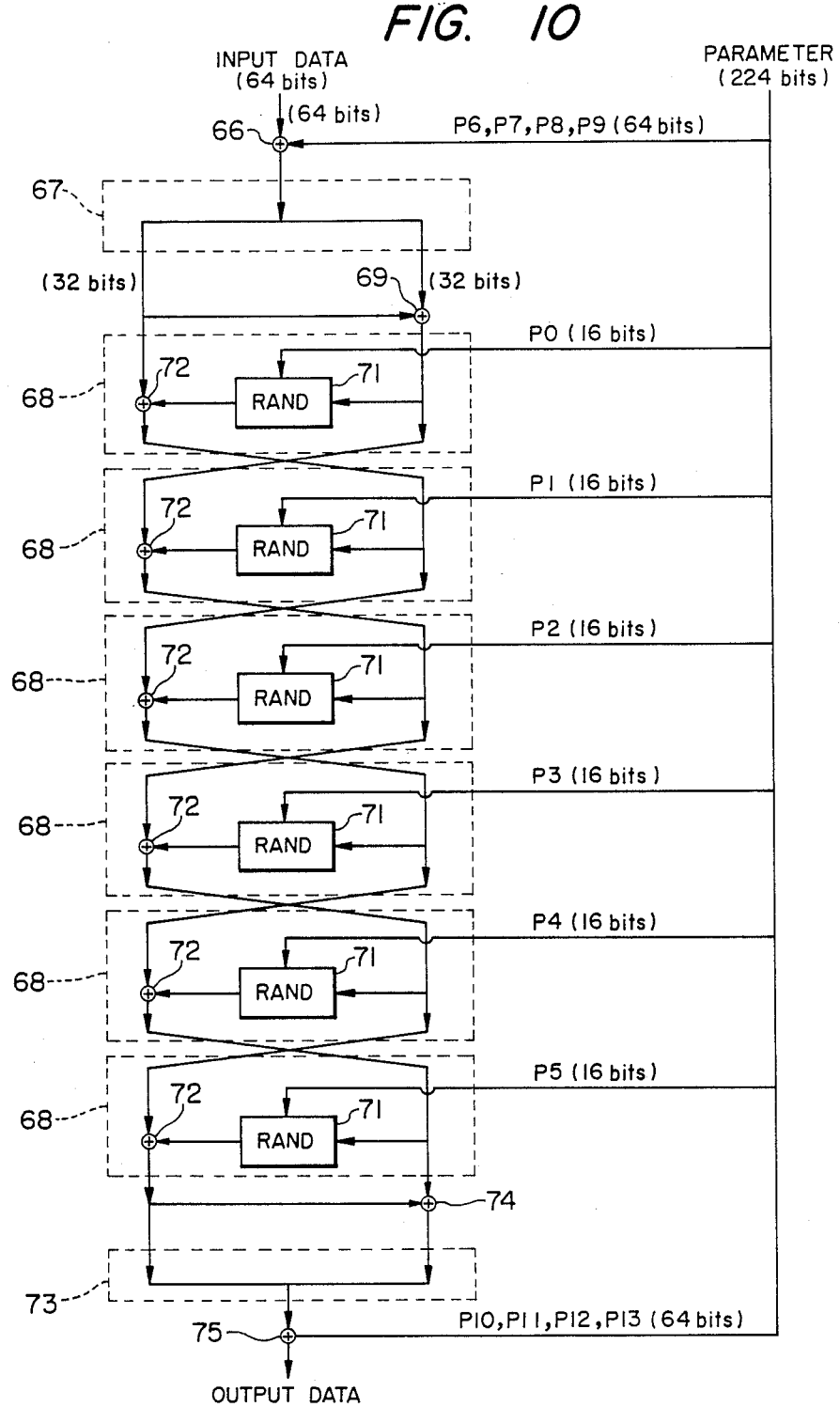
FIG. 10 is a block diagram showing a further embodiment of the invention applied to a data randomization equipment where 224-bit parameter data is used.
Figure 11:
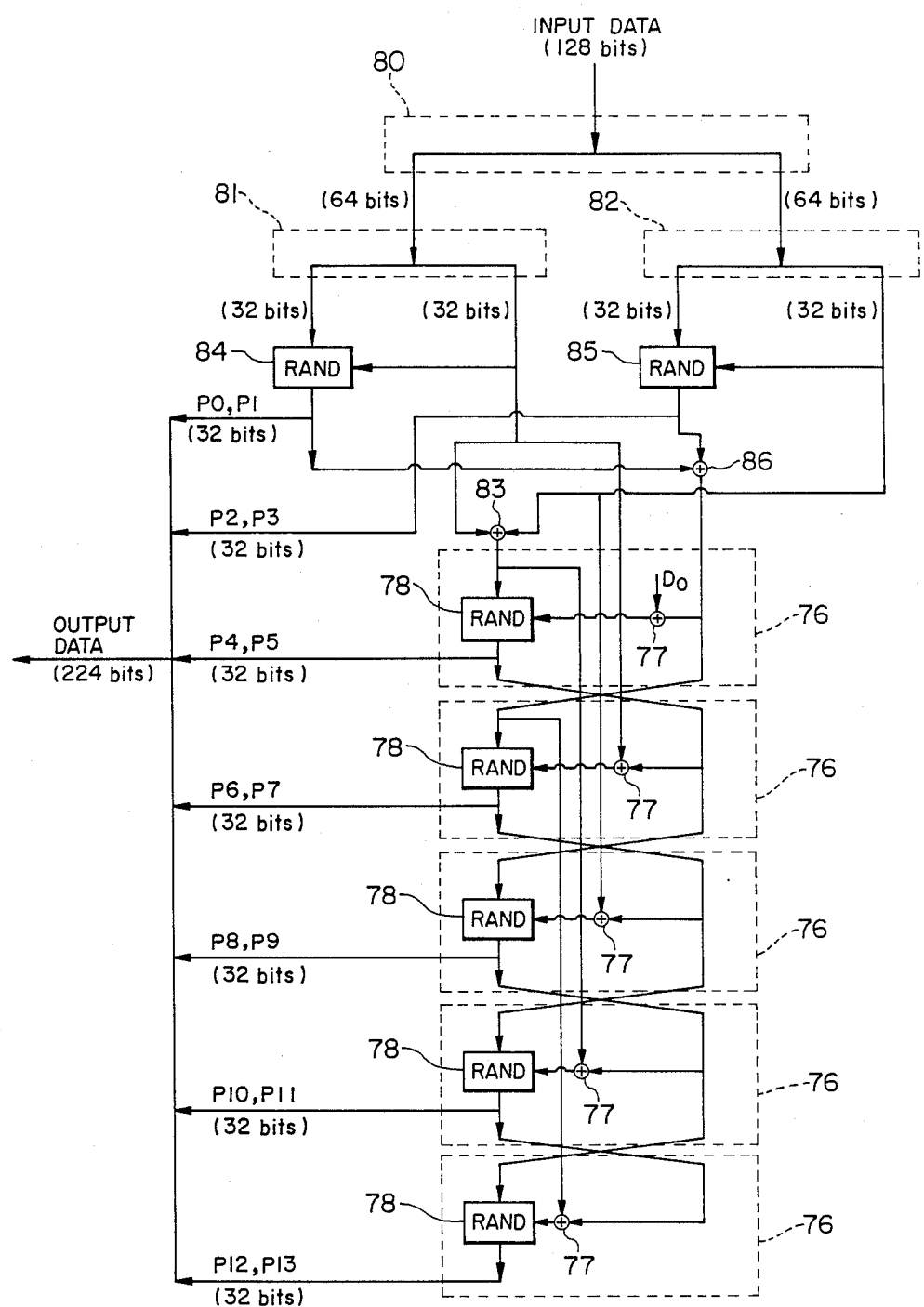
FIG. 11 is a block diagram showing a further embodiment of the randomization equipment according to the invention, in which 128-bit input data is randomized to obtain 224-bit output data.

The arrangement of FIG. 8 uses four randomization stages, but it of course is possible to provide a different number of randomization stages. FIG. 10 shows a 6-stage arrangement. In FIG. 10, parts corresponding to those in FIG. 8 are designated by like reference numerals, and their description is omitted. FIG. 11 shows an example of data randomization equipment for obtaining intermediate keys corresponding to a secret key in a case where the data randomization equipment of FIG. 10 is used for a cryptographic equipment. In this instance, the input secret key is 128-bit data, which is split in splitting part 80 into two block data each of 64 bits. The two block data are further split in splitting parts 81 and 82 into sub-block data each of 32 bits. The two right sub-block data obtained from the two splitting parts 81 and 82 are exclusively ORed in EOR circuit 83, the output of which is fed as left data to the first one of cascade-connected randomization stages 76. The two left sub-block data from the splitting parts 81 and 82 are fed to randomizing parts 84 and 85 for randomization with the respective right sub-block data. The randomized outputs of the randomizing parts 84 and 85 are fed to EOR circuit 86, the output of which is fed as right data to the first randomization stage 76. Randomization stages 76 are of the same arrangement as those shown in FIG. 9 except that EOR circuit 77 in a concerned randomization stage 76 receives left data input to the randomization stage preceded by three stages from the concerned stage 76. However, all "0" data $D_0$ is fed to EOR circuit 77 of the first randomization stage 76, and the right sub-block data noted above of the splitting parts 81 and 82 are fed to the EOR circuits 77 of the second and third randomization stages 76, respectively. The outputs of the randomizing parts 78 of the respective randomization stages 76 and outputs of randomizing parts 84 and 85 are provided in combination as 244-bit output data.

A combination of the arrangements of FIGS. 10 and 11 may be used as a cryptographic equipment as follows: The arrangement shown in FIG. 11 is used as a secret key processor, where a 128-bit secret key is input thereto and produces a 224-bit output data composed of 14 intermediate keys P0 through P13 each of 16 bits. The intermediate keys P0 to P3 from the randomizing parts 84 and 85 and the intermediate keys P4 and P5 from the first randomization stage 76 are supplied as parameter data to the first to last randomization stages 68 in FIG. 10 and the intermediate keys P6 to P9 from the second and third randomization stages 76 and the intermediate keys P10 to P13 from the fourth and fifth randomization stages 76 are supplied as parameter data to the EOR circuits 66 and 75 in FIG. 10, respectively.

As described before, the arrangements of Figs. 9 and 11 may be used as a secret key processor in a cryptographic equipment. In the secret key processing in the prior art DES cryptographic equipment shown in FIG. 2, one bit is removed from each byte of a 64-bit key, the remaining 56-bit data is subjected to bit position permutation, the resultant 56-bit data is split into two 28-bit data, these two data are subjected to leftward bit circulation by one bit or two bits 16 times, and a total of 8 bits are removed from two data resulting from each bit circulation operation while subjecting the resultant data to bit position permutation. In this way, 16 different 48-bit intermediate keys are obtained. In this secret key processing, when one of the intermediate keys is known, there are only 8 unknown bits for the leftward bit circulation has been made public. Therefore, the two 28-bit block data can be estimated, so that it is possible to estimate the original 64-bit secret key.

Where the arrangements shown in FIGS. 9 and 11 are employed for secret key processing, however, the estimation of the original secret key is difficult. In each of the randomizing parts 78, 84 and 85, if two data among two input data and one output data are known, the remaining data can be known. In the case of FIG. 9, however, the key data of the input data consists of 64 bits. Therefore, even if 64 bits of the intermediate keys P8 to P11, for example, are known, the output data of the EOR circuit 77 in the last stage 76 can not be known because it is only data P8 and P9 that are known as one input to the EOR circuit 77 in the last randomization stage 76. That is, only output data P10 and P11 are known with respect to the randomizing part 78 of this stage, and two input data are unknown. Therefore, these input data of that randomizing part 78 can not be determined. For this reason, it is possible to employ other data randomization equipment than those shown in FIGS. 3 to 6 as randomizing parts 78, 84 and 85 in FIGS. 9 and 11. Even in this case, it is difficult with the arrangements of FIGS. 9 and 11 to estimate a correct secret key when some of the intermediate keys are known. In other words, the arrangement itself of the data randomization equipment of FIG. 9 or 11 can effectively serve as data randomization equipment.

Further, with the data randomization equipment according to the invention, a one-bit change in the input data leads to a change in nearly one half of the output data bits at all time as noted before. Therefore, by feeding suitably varying data as input data, randomly changing output data can be obtained. This output data may be regarded as random number data. This means that the data randomization equipment according to the invention may be used as a random number generator as well.

In the cases of FIGS. 3 to 6, the input data was split into 8-bit (i.e., one-byte) data. However, it is possible to split the input data into 16-bit data. In this case, the modulo operation is based on mod 65536 instead of mod 256. Further, in the arrangement of FIG. 9, it is possible to combine the left and right data outputs of the last randomization stage 76 and provide the sole resultant 32-bit data as randomized data.

The reason for feeding the constant +1 for addition to the addition/modulo operation circuits 33 and 39 in FIGS. 4 and 5 is that unless the constant +1 is added, such a deficiency may occur that when the input data R and parameter data are both zero, the output data is also zero, that is, the input and output data coincide. This is undesired where the data randomization equipment is used for a cryptographic equipment. The deficiency is avoided by the addition of the constant. For this reason, the constant need not be +1 and may be a different number. The addition of the constant is unnecessary where the data randomization equipment is not used for any cryptographic equipment but is employed merely for data randomization.

The individual circuits, parts and stages described in the foregoing may be implemented by hardware, or their processes may be partly or totally realized using an electronic computer.

With the embodiments (FIGS. 4 and 5) according to the invention a one-bit change in the input data leads to a change of 11 bits of the output data in average, whereas with the prior art equipment the same input data change leads to only a change in 4 bits of the output in average. By substituting the data randomization equipment according to the invention for the data randomization equipment of the prior art DES cryptographic equipment, the encryption stages necessary for the saturation of the data randomization may be reduced from five stages to two or three stages.

We claim:

1. Data randomization equipment comprising:
   splitting means for splitting input data into a plurality of blocks of data each of which has the same data length;
   a plurality of processing channels each of which is operative to successively process therealong respective block data supplied thereto as respective channel data from said splitting means;
   at least one function operation means provided in each of said processing channels for subjecting the channel data in said processing channel to a function operation at least once to produce new data as channel data;
   at least one branching means provided in each of said processing channels for supplying the channel data from said processing channel to the function operation means in another one of said processing channels, each of said function operation means performing its function operation in relation to the channel data received from said branching means of another one of said processing channels so that the channel data of each processing channel is eventually operated with the channel data of all the other processing channels; and
   combining means for combining the channel data from the outputs of all of said processing channels to produce randomized output data.

2. The data randomization equipment of claim 1 wherein a plurality of transform operation means are provided in said processing channels downstream of the function operation means in said processing channels to transform the respective channel data from respective ones of said function operation means.

3. The data radomization equipment of claim 2 wherein operation changeover means is provided in at least one of said processing channels for altering the operation processing of the transform operation means in said channel in accordance with either the channel data of another one of said processing channels or in accordance with parameter data supplied thereto.

4. The data randomization equipment of claim 3 wherein said operation changeover means is operative to determine whether channel data is to be passed directly or after being operated upon.

5. The data randomization equipment of claim 3 wherein said operation changeover means selects either function operation means or transform operation means for operation.

6. The data randomization equipment of claim 1 including parameter operating means for receiving parameter data and for subjecting the channel data of at least one of said processing channels to a function operation in relation to said parameter data.

7. The data randomization equipment according to one of claims 1 or 6 wherein said function operation means performs an addition operation on two data and then performs a modulo operation on the resultant sum data.

8. The data randomization equipment of claim 6 wherein said parameter operating means is disposed in said at least one processing channel upstream of the function operation means in said processing channel to produce new channel data.

9. The data randomization equipment of claim 8 wherein said processing channels comprise first to fourth processing channels, said splitting means being operative to split said input data into four blocks of data to be processed as first to fourth channel data through said first to fourth processing channels respectively, said function operation means comprising first to fourth function operation means disposed in said first to fourth processing channels respectively, said branching means comprising first to fourth branching means provided in said first to fourth processing channels respectively, said transform operation means comprising first to fourth transform operation means disposed in said first to fourth processing channels respectively, said parameter operating means comprising first and second parameter operating means in two of said first two fourth processing channels for receiving first and second parameter data respectively and for subjecting the corresponding channel data to function operations in relation to said first and second parameters data, fifth function operation means in a first one of said first to fourth processing channels for subjecting the corresponding channel data to a function operation in relation to the channel data from a fifth branching means provided in another one of said first to fourth processing channels, and sixth function operation means in a second one of said first to fourth processing channels for subjecting the corresponding channel data to a function operation in relation to channel data from a sixth branching means provided in another one of said first to fourth processing channels, said combining means being operative to combine the first to fourth channel data outputs from said first to fourth processing channels.

10. The data randomization equipment of claim 9 wherein each of said first and second parameters operating means performs an exclusive OR operation on the corresponding channel data and a corresponding one of said first and second parameter data, at least one of said function operation means in each of said first to fourth processing channels being modulo operation means which performs an addition of at least two channel data supplied thereto and then performs a modulo operation on the resultant sum data.

11. The data randomization equipment of claim 9 wherein at least one of said first to sixth function operation means receives a constant as well as two channel data and performs a function operation on said two channel data and said constant.

12. The data randomization equipment of claim 6 wherein said parameter operating means is in said at least one of said processing channels and produces new channel data.

13. The data randomization equipment of claim 6 wherein said parameter operating means is in respective ones of said branching means to modify the channel data which is to be supplied via said respective branching means to corresponding ones of said function operation means respectively.

14. The data randomization equipment of claim 13 wherein said processing channels constitute first to fourth processing channels, said splitting means being operative to split said input data into four blocks of data to be processed as first to fourth channel data through said first to fourth processing channels respectively, said function operation means constituting first to fourth function operation means disposed in said first to fourth processing channels respectively, said branching means constituting first to fourth branching means provided in said first to fourth processing channels respectively, said transformation operation means constituting first to fourth transformation operation means disposed in said first to fourth processing channels respectively, said parameter data constituting first to fourth parameter data each of which has the same data length as each of said channel data, said parameter operating means constituting first to fourth parameter operating means in respective ones of said first to fourth branching means, fifth function operation means in a first one of said first to fourth processing channels for subjecting the corresponding channel data to a function operation in relation to channel data from a fifth branching means provided in another one of said first to fourth processing channels, and sixth function operation means in a second one of said first to fourth processing channels for subjecting the corresponding channel data to a function operation in relation to channel data from a sixth branching means provided in another one of said first to fourth processing channels, said combining means being operative to combine the first to fourth channel data output from said first to fourth processing channels.

15. The data randomization equipment of claim 14 wherein each of said first to fourth parameter operating means is an OR operation means which performs an exclusive OR operation on the corresponding channel data and a corresponding one of said first to fourth parameter data, at least one of said function operation means in each of said first to fourth processing channels being modulo operation means which performs an addition of at least two channel data supplied thereto and then performs a modulo operation on the resultant sum data.

16. The data randomization equipment of claim 14 wherein at least one of said first to sixth function operation means receives a constant as well as two channel data and performs a function operation on the two channel data and said constant.

17. The data randomization equipment of claim 6 wherein said processing channels constitute first and second processing channels, said splitting means being operative to split said input data into two blocks of data to be processed as first and second channel data in said first and second processing channels respectively, said function operation means constituting first and second function operation means provided in said first and second processing channels respective, said transform operation means constituting first and second transform operation means provided in said first and second processing channels downstream of said first and second function operation means respectively, said branching means constituting first and second branching means in said first and second processing channels for branching said first and second channel data to said second and first function operation means respectively, said parameter operating means constituting first and second parameter operating means in said first and second branching means for receiving said parameter data as first and second parameter data and for function operating said first and second parameter data on said first and second channel data to modify the first and second channel data to be fed to said second and first function operation means respectively, the first and second channel data output from said first and second processing channels being combined by said combining means.

18. The data randomization equipment of claim 17 wherein each of said first and second parameter operating means performs an exclusive OR operation on the corresponding one of said first and second channel data and the corresponding one of said first and second parameter data, each of said first and second function operation means being a modulo operation means which performs an addition operation on the corresponding channel data and the corresponding modified channel data and then performs a modulo operation on the resultant sum data.

19. The data randomization equipment according to one of claims 2, 6, 9, 14, 4 or 5 wherein at least one of said transform operation means performs a bit circulation operation on channel data.

20. The data randomization equipment according to one of claims 2, 6, 9, 14, 4 or 5 wherein at least one of said transform operation means performs bit position permutation of channel data through a wired circuit.

21. The data randomization equipment according to one of claims 2, 6, 9, 14, 4 or 5 wherein at least one of said transform operation means reads out data from a memory according to channel data and provides new data in place of the channel data.

22. Data randomization equipment comprising:
splitting means for splitting input data into four blocks of data each of which has the same data length;
four processing channels for processing the four blocks of data respectively supplied thereto as four channel data from said splitting means;
first function operation means in each of said four processing channels respectively for subjecting the channel data in each of said processing channels to a function operation in relation to the channel data of another one of said processing channels to produce new channel data;
first branching means provided in each of said four processing channels for supplying channel data from each of said processing channels to the first function operation means in another one of said processing channels;
second function operation means in each of at least two of said processing channels upstream of the respective first function operation means in said at least two processing channels for function-operating the corresponding channel data on the channel data of another one of said four processing channels to produce new channel data;
second branching means in each of at least two of said processing channels for supplying the corresponding channel data to said second function operation means in another one of said four processing channels; and
combining means for combining the four channel data outputs from said four processing channels to produce randomized output data.

23. The data randomization equipment of claim 22 including parameter operating means in at least one of said four processing channels for subjecting the corresponding channel data to a function operation in relation to parameter data so as to produce new channel data.

24. The data randomization equipment of claim 22 including parameter operating means in at least one of said four branching means for function-operating parameter data on the branched channel data to produce new branched channel data to be supplied to the corresponding one of said four first function operation means.

25. The data randomization equipment of one of claims 22, 23, or 24 wherein a transform operation means is provided in each of said four processing channels downstream of the first function operation means in said processing channels for subjecting the corresponding channel data to a transform operation to produce new channel data.

26. The data randomization equipment of claim 25 wherein said transform operation means performs bit circulation on the corresponding channel data input thereto to produce new channel data.

* * * * *